US010258977B2

United States Patent
Furrukh

(10) Patent No.: US 10,258,977 B2
(45) Date of Patent: Apr. 16, 2019

(54) DEVELOPMENT OF NANOFILTRATION SYSTEM WITH LA/SNO$_2$—TIO$_2$ NANOPARTICLES

(71) Applicant: Muhammad Akhyar Furrukh, Lahore (PK)

(72) Inventor: Muhammad Akhyar Furrukh, Lahore (PK)

( * ) Notice: Subject to any disclaimer, the term of this patent is extended or adjusted under 35 U.S.C. 154(b) by 318 days.

(21) Appl. No.: 15/131,814

(22) Filed: Apr. 18, 2016

(65) Prior Publication Data

US 2017/0296977 A1    Oct. 19, 2017

(51) Int. Cl.
| | | |
|---|---|---|
| *B01D 61/02* | (2006.01) | |
| *B01D 67/00* | (2006.01) | |
| *B01D 69/14* | (2006.01) | |
| *B01D 71/20* | (2006.01) | |
| *B01J 21/06* | (2006.01) | |
| *B01J 23/10* | (2006.01) | |
| *B01J 23/14* | (2006.01) | |
| *B01J 35/00* | (2006.01) | |
| *B01J 35/06* | (2006.01) | |
| *B01J 37/02* | (2006.01) | |
| *B01J 37/08* | (2006.01) | |

(52) U.S. Cl.
CPC ...... *B01J 37/0236* (2013.01); *B01D 67/0079* (2013.01); *B01D 67/0088* (2013.01); *B01D 69/145* (2013.01); *B01D 69/148* (2013.01); *B01D 71/20* (2013.01); *B01J 21/063* (2013.01); *B01J 23/14* (2013.01); *B01J 35/002* (2013.01); *B01J 35/004* (2013.01); *B01J 35/0033* (2013.01); *B01J 35/065* (2013.01); *B01J 37/0201* (2013.01); *B01J 37/088* (2013.01); *B01D 61/027* (2013.01); *B01D 2323/46* (2013.01); *B01J 23/10* (2013.01); *B01J 2523/00* (2013.01)

(58) Field of Classification Search
CPC .... B01D 61/02; B01D 61/022; B01D 61/027; B01D 67/0018; B01D 71/58; B01D 2325/10; B01D 2325/48; B01J 37/0236
See application file for complete search history.

(56) References Cited

U.S. PATENT DOCUMENTS

| | | | | |
|---|---|---|---|---|
| 5,266,207 A | * | 11/1993 | Boye | B01D 69/10 210/490 |
| 2009/0241496 A1 | * | 10/2009 | Pintault | B01D 69/02 55/524 |
| 2011/0027599 A1 | * | 2/2011 | Hoek | B01D 61/027 428/476.3 |

(Continued)

OTHER PUBLICATIONS

Sotto, Arcadio et al., "Nanofiltration membrane enhanced with TiO2 nanoparticles: a comprehensive study", Desalination and Water Treatment, 34, 2011, pp. 179-183. (Year: 2011).*

(Continued)

*Primary Examiner* — Jason M Greene
(74) *Attorney, Agent, or Firm* — Sarfaraz K. Niazi

(57) ABSTRACT

The purpose of this invention is to prepare lanthanum (La) supported tin oxide-titania (SnO$_2$—TiO$_2$) nanoparticles in the presence of three different solvents (Ethyl acetate, Benzyl alcohol, Ethylene glycol) as directing medium, through sol-gel followed by hydrothermal method for nanofiltration system.

3 Claims, 12 Drawing Sheets

(56) References Cited

U.S. PATENT DOCUMENTS

| | | | |
|---|---|---|---|
| 2013/0118983 A1* | 5/2013 | Livingston | B01D 61/027 210/654 |
| 2014/0319044 A1* | 10/2014 | Giannelis | B01D 61/027 210/321.6 |
| 2016/0296891 A1* | 10/2016 | Kong | B01D 71/58 |
| 2017/0050150 A1* | 2/2017 | Yu | B01D 67/0072 |

OTHER PUBLICATIONS

Manjumol, K.A. et al., "Synthesis of lanthanum oxide doped photocatalytic nano titanium oxide through aqueous sol-gel method for titania multifunctional ultrafiltration membrane", Journal of Sol-Gel Technology, 53, 2010, pp. 353-358. (Year: 2010).*

Du, Jun et al., "Hydrophilic and photocatalytic performance of lanthanum doped titanium dioxide thin films", Journal of Rare Earths, 31, 10, Oct. 2013, pp. 992-996. (Year: 2013).*

Sibu, C.P. et al., "Structural Modifications and Associated Properties of Lanthanum Oxide Doped Sol-Gel Nanosized Titanium Oxide", Chemical Materials, 14, 2002, pp. 2876-2881. (Year: 2002).*

* cited by examiner

DEVELOPMENT OF NANOFILTRATION SYSTEM WITH LA/SNO$_2$—TIO$_2$ NANOPARTICLES

BACKGROUND OF THE INVENTION

The technique of nanofiltration lies between ultrafiltration and reverse osmosis. However, nanofiltration is a low cost process and is capable of removing pesticides, organic matter, desalination of sea water, oil process and pollutants from industrial waste water. The separation mechanism can be attributed to dielectric, sieving and Donnan effect. Charged nanofiltration membrane attracts opposite charges to pass through it and repels like charges on the basis of difference in dielectric constant. The main challenge in implementation of nanofiltration membrane is its propensity towards fouling and low performance at high temperature. The membrane fouling is a critical problem for efficient commercialization of nanofiltration. Nanoparticles based membranes can be developed by assembling engineered nanoparticles into porous membranes or blending them with polymeric or inorganic membranes.

Most of the research in the field of nanoscience is dedicated to the development of different synthesis routes to nanoparticles and nanostructures. These efforts gave access to nanomaterials with a wide range of compositions, monodisperse crystallite size, unprecedented crystallite shapes and with complex assembly properties. TiO$_2$ nanostructures have a wide range of applications due to their optical and catalytic properties which depend on the crystalline state (anatase, rutile or brookite). Due to strong oxidizing power, high stability, high chemical inertness and having low cost of titanium dioxide semiconductor make it a promising material for photocatalytic applications. Among all, anatase phase exhibits most metastable and photocatalytic properties. Calcination temperature render the material to a single crystalline phase. Anatase phase is present if calcination is carried out at 400° C. 51.46% while calcination at 600° C. only rutile phase is obtained. Tin oxide (SnO$_2$), a transparent conducting oxide (TCO) has a tetragonal rutile structure, with a bandgap of 3.6 eV. Unloaded SnO$_2$ has the property of low electrical resistance and high optical transparency in visible range of electromagnetic spectrum. It has applications in solar cell, light emitting diodes, transparent electromagnetic shielding material.

RE (rare earth)-doped (Gd, Sm, Eu etc) nano-materials may play an important role in fabricating devices like optical, telecommunication, solid-state lasers, and many others. Therefore, the development of a facile synthetic method toward high quality RE-doped nanomaterial with uniform size and shape appears to having key importance for exploration of new research and application fields. RE-doped nanoparticles have been suggested as a promising new class of material, in comparison with organic dyes and semiconductor quantum dots and show superior chemical and optical properties.

The purpose of this invention is to prepare tin oxide-titania (SnO$_2$—TiO$_2$) nanoparticles in the presence of three different solvents (Ethyl acetate, Benzyl alcohol, Ethylene glycol) as directing medium, through sol-gel followed by hydrothermal method. Study of the effect of different solvents on base material SnO$_2$—TiO$_2$ was carried out by keeping all other factors constant. Lanthanum metal was doped on the base material SnO$_2$—TiO$_2$. The relation between particle size and band gap of La/SnO$_2$—TiO$_2$ was investigated. Photocatalytic activity was studied with the degradation of Methylene Blue. Photocatalytic applications of La/SnO$_2$—TiO$_2$ prepared in the presence of three solvents was compared. The effect of varying dielectric constant of solvents on band gap and photocatalytic activity was also studied in the nanofiltration system.

BRIEF SUMMARY OF THE INVENTION

Lanthanum (La) doped tin oxide-titanium oxide (SnO$_2$—TiO$_2$) nanoparticles were synthesized by sol-gel method followed by hydrothermal method. The effect of different solvents (Ethyl acetate, Benzyl alcohol, Ethylene glycol) on particle size and catalytic activity was investigated. The nanoparticles were characterized by powder X-ray diffraction, transmission electron microscope, scanning electron microscope and energy dispersive X-ray. The optical and catalytic properties were investigated using solid phase spectrophotometer and UV-Visible spectroscopy respectively. Gas Chromatography-Mass Spectrometry (GC-MS) was used to detect the intermediate during the catalytic degradation of Methylene Blue. It was observed that with a decrease in dielectric constant (E) of solvent the particle size and band gap decreases and catalytic efficiency increases. Hence, the highest catalytic activity was observed with the solvent having the least dielectric constant.

In this work, Lanthanum (La) doped tin oxide-titanium oxide (SnO$_2$—TiO$_2$) nanoparticles have been incorporated into nanofiltration membranes to improve the performance under critical conditions. The use of nanoparticles in the manufacturing of membranes allows for both a high degree of control over membrane fouling and the ability to produce desired structure as well as their functionalities.

DETAILED DESCRIPTION OF THE INVENTION

Method of Preparation of Nanofilter Membrane

Figure 1A:
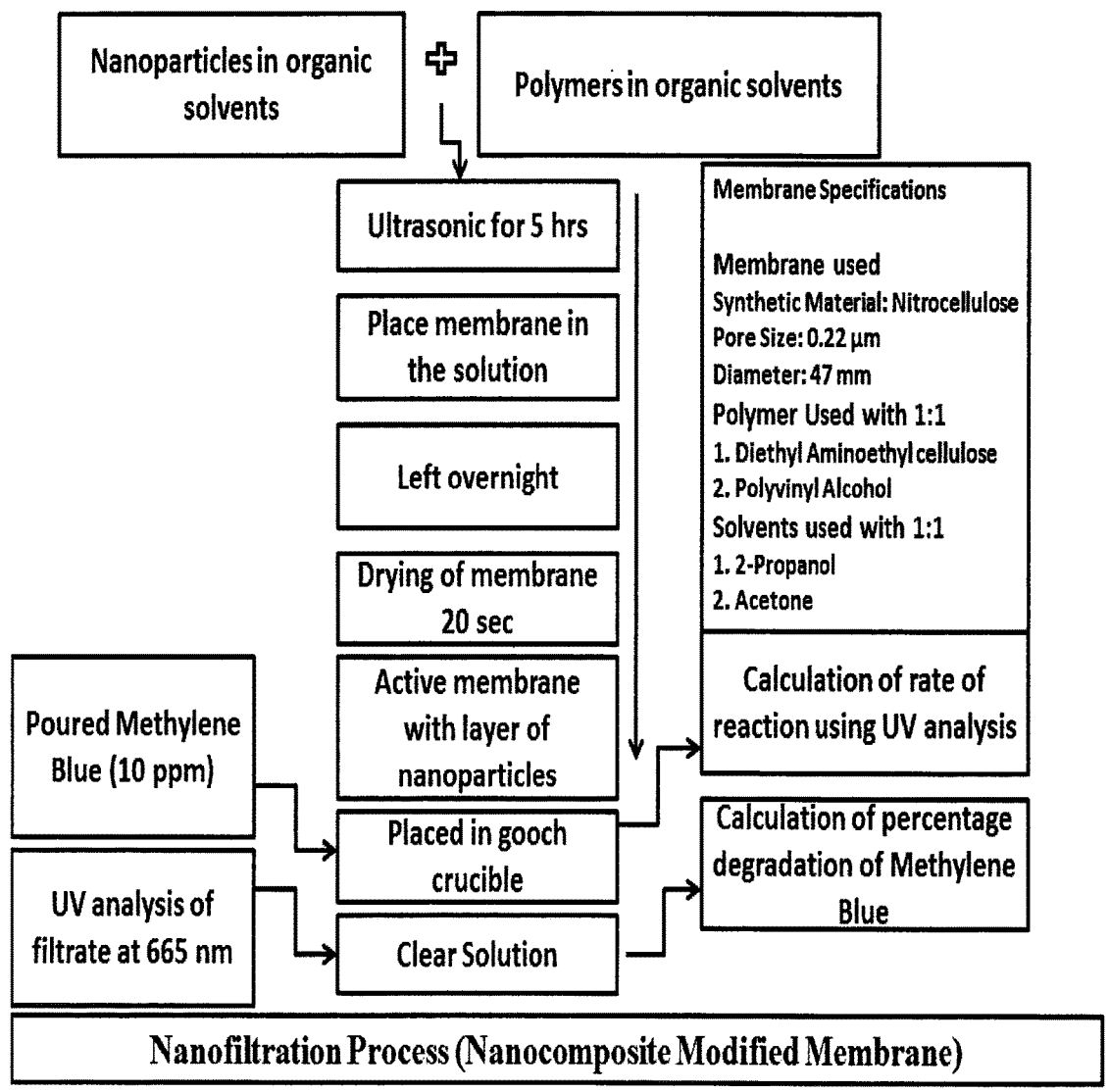
FIG. 1A. depicts preparation of a nanofiltration membrane system for waste water treatment.

The instant invention is a method of preparing a nanofilter membrane comprising:
(a) preparing lanthanum doped tin-oxide and titanium oxide nanoparticles by adding, 50 mg of each of tin-oxide and titanium-oxide nanoparticles in 0.004M lanthanum precursor solution, mixing for 30 minutes to form a mix, adjusting the pH of the mix between 3-4, treating the mix in a hydrothermal autoclave for 120 minutes at 160° C., centrifuging the mix at 13000 rpm for 5 minutes, drying and calcining the mix 70° C. and 550° C., respectively;
(b) preparing a dispersion of the lanthanum doped tin-oxide and titanium-oxide nanoparticles by adding 15 mg of nanoparticle (a) into 20 mL acetone and 20 mL 2-propanol;
(c) preparing a solution 1 g of diethylaminoethyl cellulose and 1 g of polyvinyl alcohol in 20 mL distilled water and sonicating it for 120 minutes;
(d) mixing the dispersion (b) and the solution (c) and sonicating it for 5 hours to form a mixture;
(e) immersing a nitrocellulose membrane with porosity of 0.22 microns in the mixture (d) and allowing soaking for at least 12 hours; and,
(f) drying the nitrocellulose membrane (e) in air for 20 seconds and then placing it in a gooch crucible to dry.

Synthesis of Tin Oxide (SnO$_2$) Nanoparticles:

Sol-gel approach was used for the synthesis of SnO$_2$, appropriate amount (1:5) of tin precursor and solvent were mixed at room temperature. Sodium hydro-oxide was added at the rate of 0.2 mL per 5 minutes under continuous stirring until pH 5 was obtained. The obtained gelatinous solution was centrifuged and washed at 6000 rpm for 3 minutes precipitates were dried at 70° C. and calcined at 600° C. for 90 minutes.

Synthesis of Tin Oxide/Titanium Oxide Nanoparticles:

4.5 mL titanium isopropoxide and 13.5 mL solvent were mixed. HNO$_3$ (0.32 mL in 26 mL of dist. H$_2$O) was added at rate of 0.5 mL per 5 minutes to maintain acidic pH as hydrolysis catalyst with constant stirring at 70° C. until a white milky solution of TiO$_2$ was obtained. SnO$_2$ nanoparticles were mixed in 10 mL distilled water and stirred at room temperature for 30 minutes. To this solution TiO$_2$ solution was added at rate of 2 mL per 5 minutes, with continuous stirring. After complete addition, the solution was centrifuged at 8000 rpm for 5 minutes. Precipitates were dried at 100° C. and calcined at 400° C. for 90 minutes. White powder of SnO$_2$—TiO$_2$ nanoparticles was obtained.

Synthesis of Lanthanum Doped Tin Oxide-Titanium Oxide:

Hydrothermal method was adopted for the doping of lanthanum. 50 mg of SnO$_2$—TiO$_2$ nanoparticles and 0.004 M lanthanum precursor were stirred for 30 min. The pH of the solution was adjusted 3-4 (isoelectric point of SnO$_2$—TiO$_2$). Then the above solution was transferred into hydrothermal Teflon autoclave bomb and kept in oven for 120 minutes at 160° C. The obtained solution was centrifuged at 13000 rpm for 5 minutes, dried and calcined at 70° C. and 550° C. respectively.

Fourier Transform Infra Red Spectroscopic Analysis

Figure 1B:
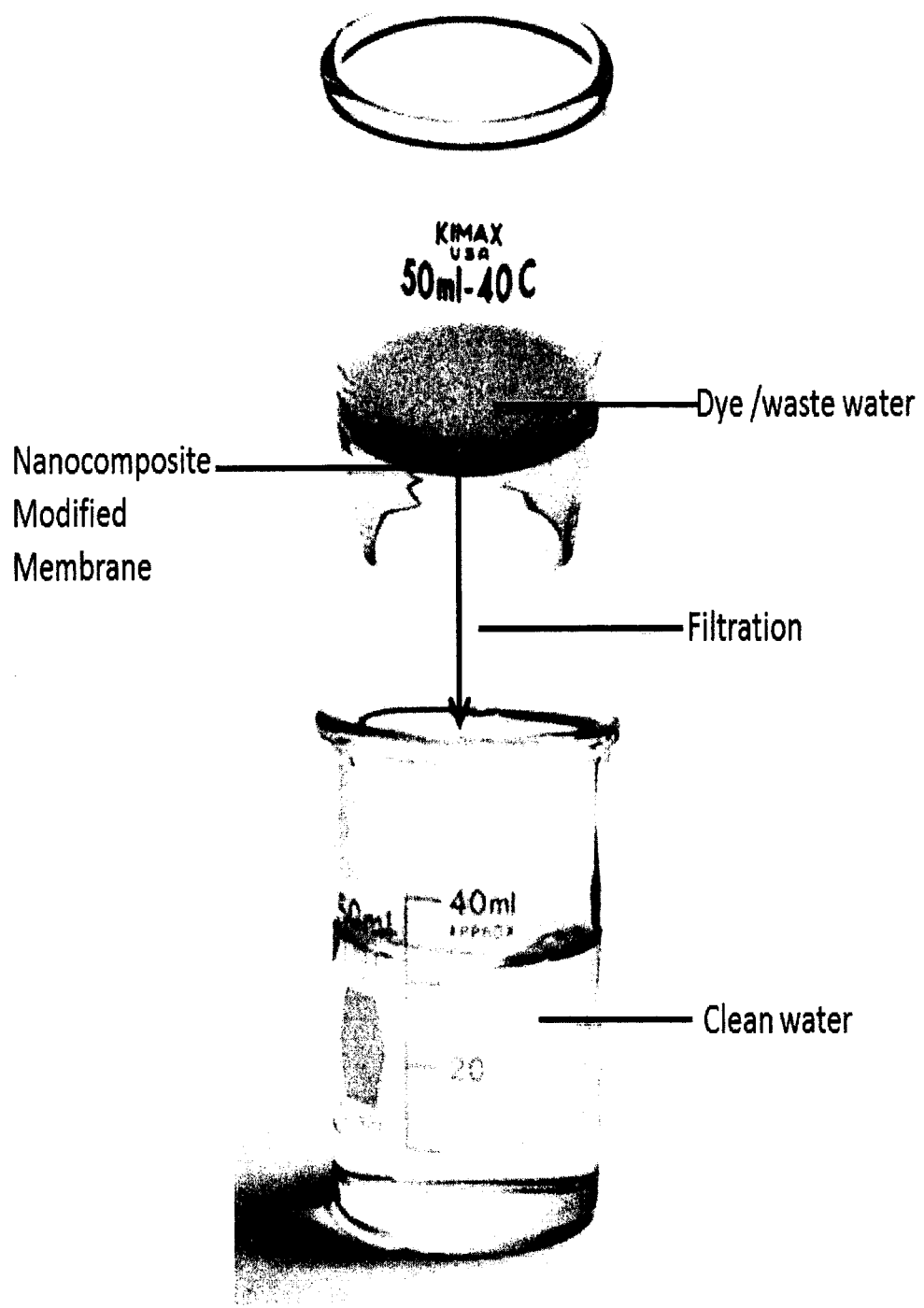
FIG. 1B. depicts laboratory scale experimental set up for nanofiltration system.
Figure 1C:
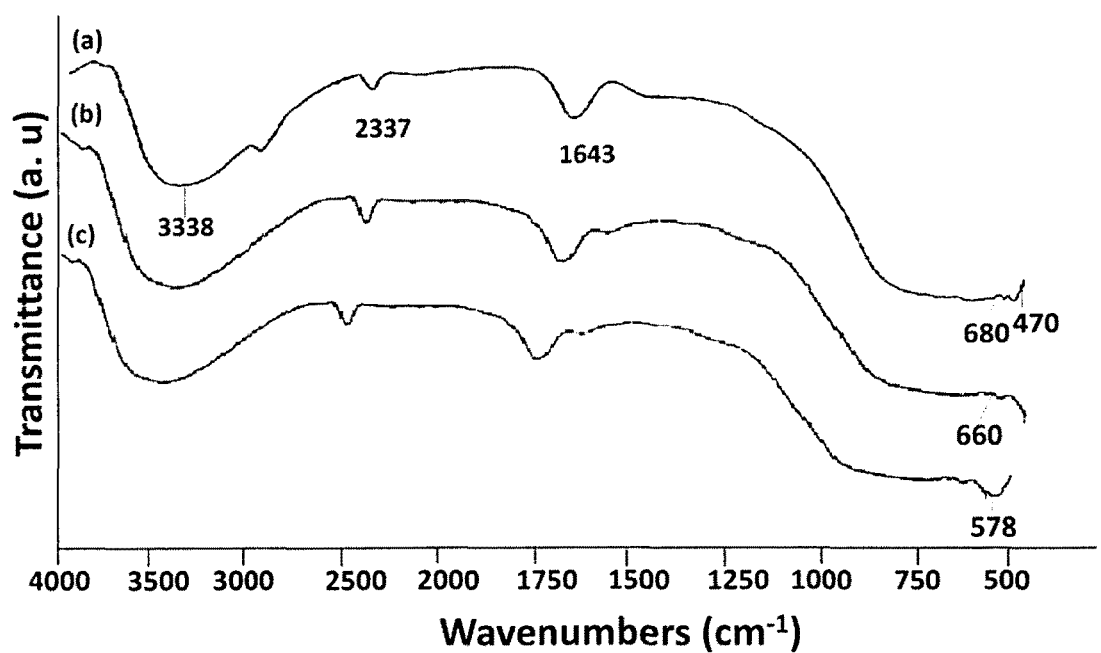
FIG. 1C shows the FTIR spectra of SnO$_2$—TiO$_2$ synthesized in three solvents. (a=ethyl acetate; b=EXD; c=benzyl alcohol)

FIG. 1C shows the FTIR spectra of SnO$_2$—TiO$_2$ synthesized in three solvents. A broad peak at 3367 cm$^{-1}$ was due to the adsorbed water and hydroxyl groups at surface before calcination. Sn—O bending vibrations were observed at 470 and 660 cm$^{-1}$, at 578 cm$^{-1}$ La—O and Ti—O vibrations were observed at 680 cm$^{-1}$. The peak at 2337 cm$^{-1}$ was due to C=O stretching vibrations, and C—H vibrations were seen at 1643 cm$^{-1}$ due to the absorption of atmospheric CO$_2$, this can be attributed to high surface area and small particle size. The FIG. 1 indicates that no impuries are present rather pure SnO$_2$—TiO$_2$ is obtained and unreacted solvent or precurssor are successfully removed through washing. While same spectra was observed for La/SnO$_2$—TiO$_2$ because La metal does not show any vobration.

Scanning Electron Microscopy-Energy Dispersive X-Ray (SEM-EDX) Analysis

Figure 2A:
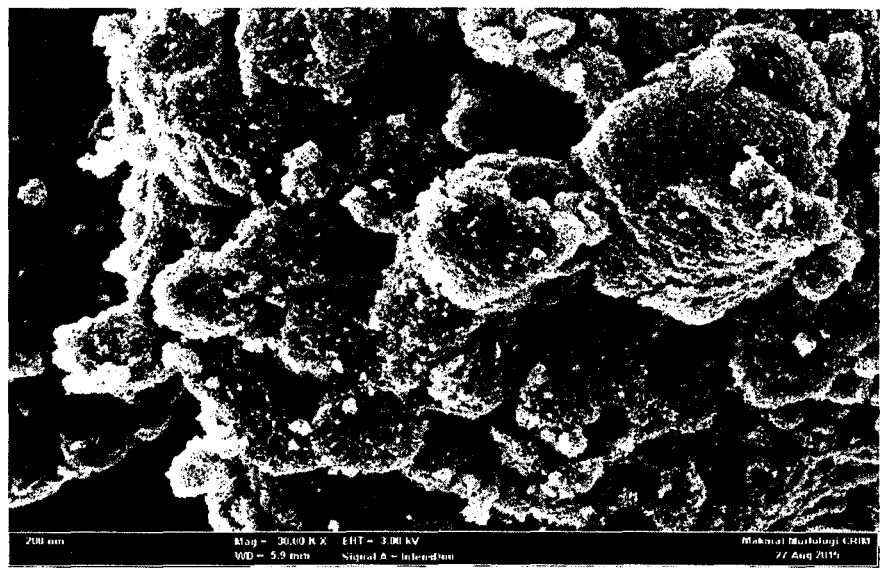
FIG. 2A depicts the SEM image of La/SnO$_2$ TiO$_2$ prepared in the presence of Ethyl Acetate
Figure 2B:
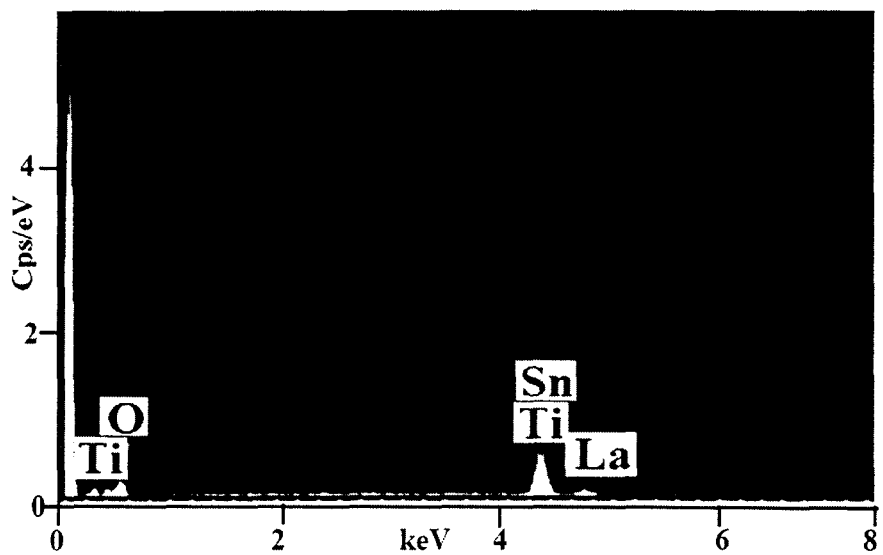
FIG. 2B depicts EDX.
Figure 3A:
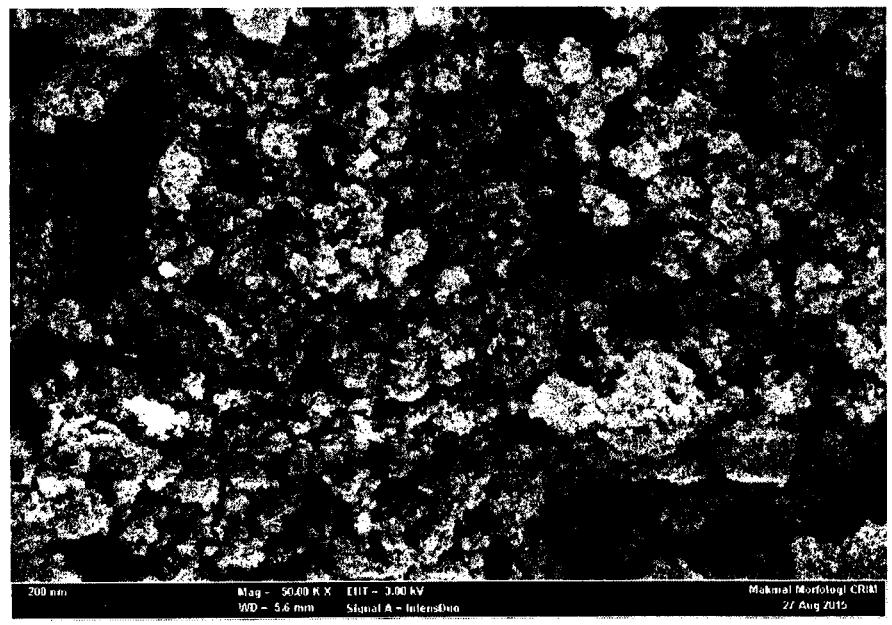
FIG. 3A depicts SEM image of La/SnO$_2$ TiO$_2$ prepared in the presence of Ethylene Glycol.
Figure 3B:
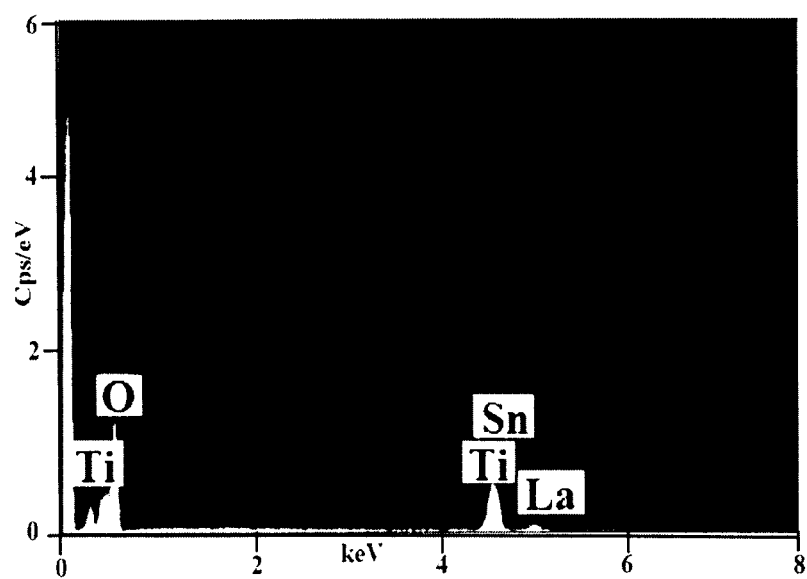
FIG. 3B depicts EDX.
Figure 4A:
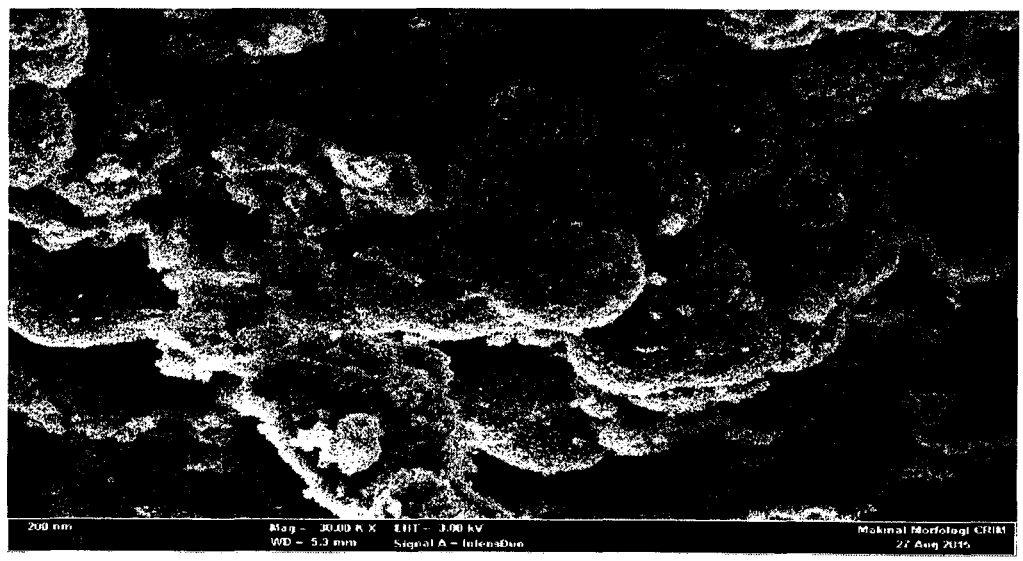
FIG. 4A depicts a SEM image of La/SnO$_2$ TiO$_2$ prepared in the presence of Benzyl Alcohol
Figure 4B:
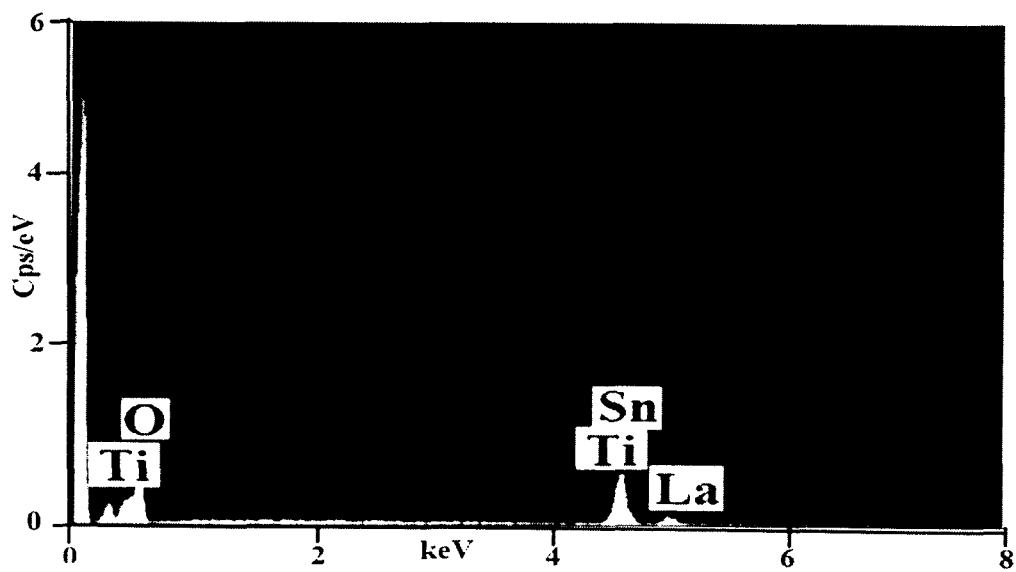
FIG. 4B depicts EDX.

SEM (FIGS. 2A, 3A and 4A) images were used to investigate the morphology of the synthesized nanomaterial. EDX (FIGS. 2B, 3B and 4B) confirmed the purity of La/SnO$_2$ TiO$_2$ nanoparticles. The theoretical percentage of La, Sn, Ti and O in composites is 37.351%, 31.938%, 12.72% and 17.32% respectively. Experimental percentages of Ti varied from 17.8 to 11.4% and of O from 12.4 to 19.37%. It was observed that with the decrease in dielectric constant of solvent the weight percent of Ti increase. The dielectric constant of ethyl acetate is 6 while the weight percent of Ti prepared with this solvent was maximum 17.8% and ethylene glycol has dielectric constant 37 and weight percent of Ti 11.4%. Which as a result enhance photocatalytic activity of nanoparticles as given in Table 1.

TABLE 1

Structural, catalytic and optical parameters of La/SnO$_2$—TiO$_2$ synthesized by different solvents.

| Sample Code | Solvent | Particle Size (nm) | | | Band Gap (eV) | Dielectric constant ($\epsilon$) | % age degradation (Nano filtration) | Rate Constant min$^{-1}$ |
| --- | --- | --- | --- | --- | --- | --- | --- | --- |
| | | Scherrer | W-H | TEM | | | | |
| EA | Ethyl acetate | 3.5 | 5.8 | 8.04 | 4.0 | 6.0 | 97.95 | 0.090 |
| BA | Benzyl alcohol | 4.7 | 8.2 | 13.5 | 4.2 | 13.5 | 89.76 | 0.070 |
| EG | Ethylene Glycol | 5.8 | 13.5 | 15.1 | 4.5 | 37 | 81.86 | 0.027 |

Transmission Electron Microscopy

Figure 5:
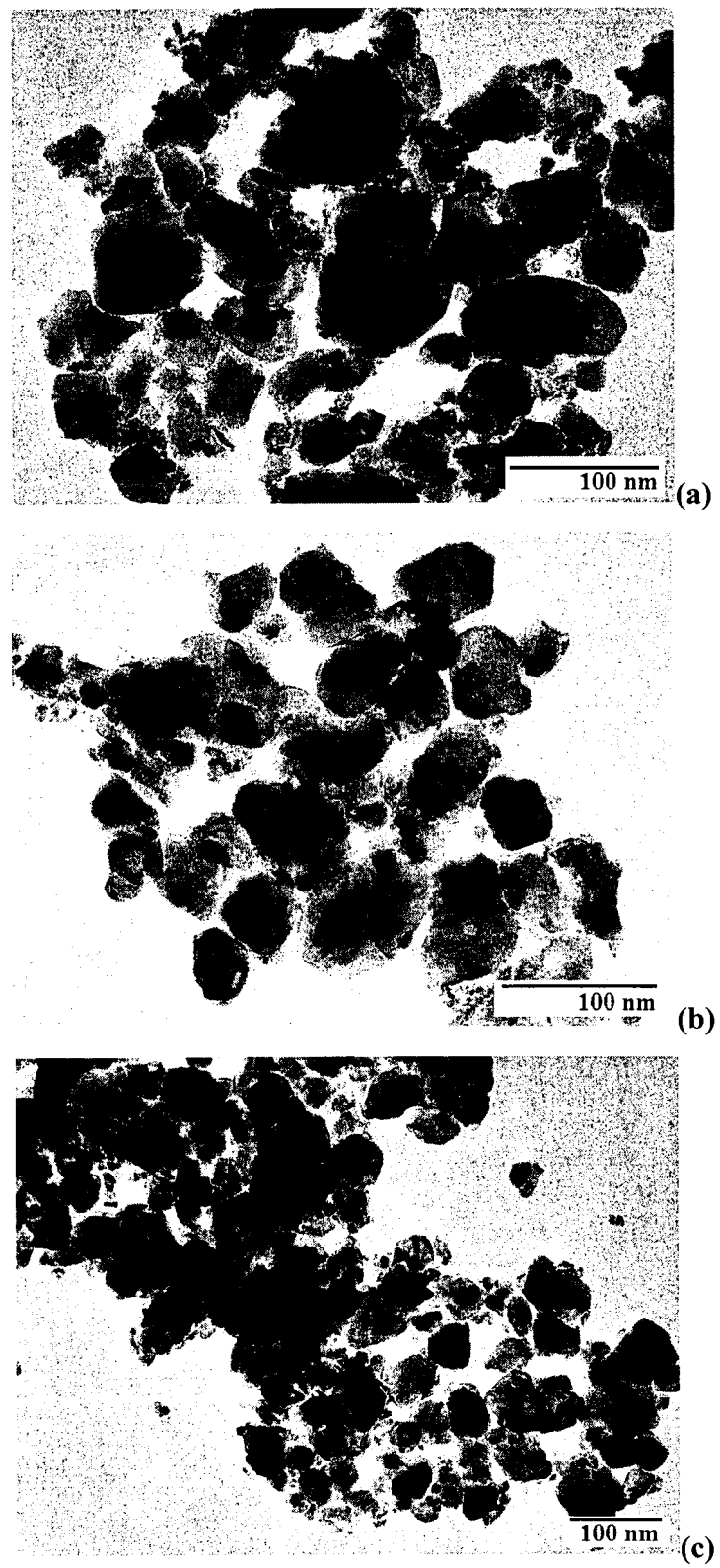
FIG. 5 depicts the TEM images of La/SnO$_2$—TiO$_2$ prepared in the presence of (a) Ethyl acetate (b) Benzyl alcohol and (c) Ethylene glycol.

TEM images of La/SnO$_2$ TiO$_2$ are given in the FIG. 5. Average size of particles calculated for Ethyl acetate, Benzyl alcohol and Ethylene glycol are 8.04, 13.5 and 15.1 nm respectively which are closely related to XRD results.

Morphology and Structural Properties

Figure 6:
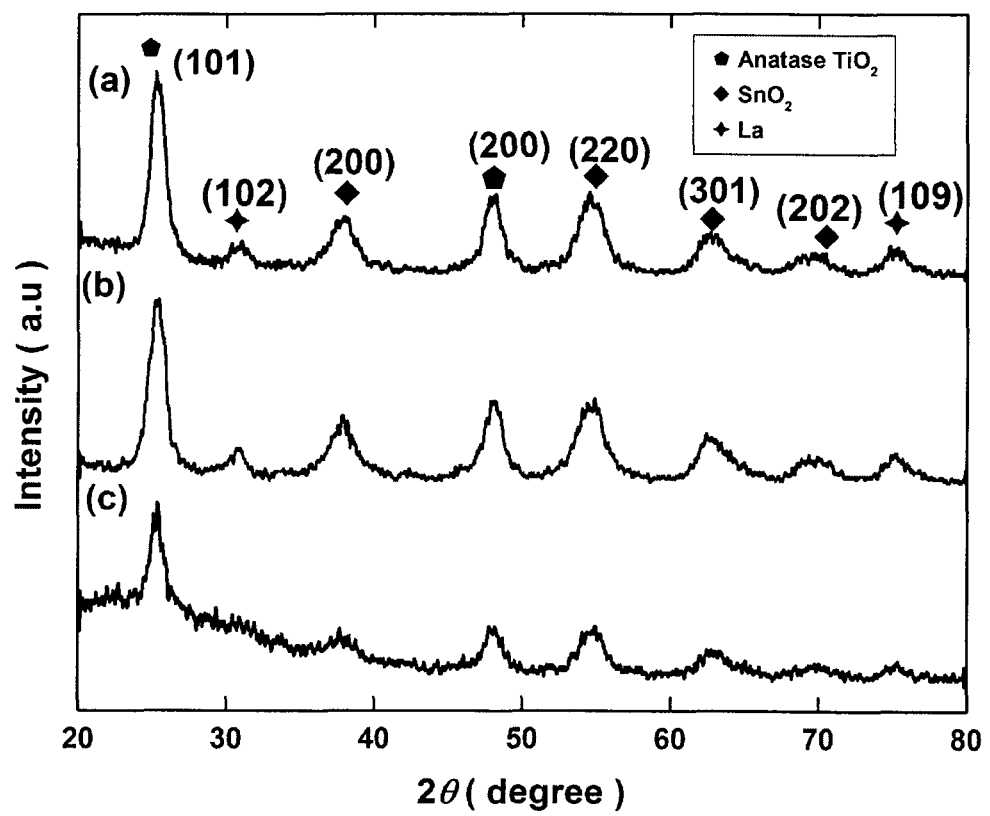
FIG. 6 shows XRD patterns of La/SnO$_2$—TiO$_2$ synthesized with different solvents

FIG. 6 shows XRD patterns of La/SnO$_2$—TiO$_2$ synthesized with different solvents. The scanning angle ranged from 20° to 80°. Two major peaks corresponds to the (110) and (211) planes of anatase phase of TiO$_2$. Peaks consistent with the (200), (220), (103) and (202) are planes of SnO$_2$. Peaks consistent with (102) and (109) (03-065-7671) are planes of La. The average grain size (D) of the crystallite in nanocomposite was calculated using Scherrer equation (eq 1). We found that crystallite size increase from 5.8 nm to 15.1 nm with the increase in dielectric constant from 6 to 37 of the solvents.

$$D = \frac{0.9\lambda}{\beta \cos\theta} \quad (1)$$

where $\beta$ is the full-width at half maximum (FWHM), $\theta$ is the Braggs diffraction angle, and $\lambda$ is the x-ray wavelength. The mean grain size of the nanocomposite and FWHM value of the highest peak both depends on the solvent used during synthesis of base material. Strain induced in the powder due to crystal imperfection and distortion which can be calculated as:

$$\varepsilon = \beta/4 \tan\theta \quad (2)$$

Williamson-Hall method does not varies as 1/cos $\theta$ as in Scherrer, but it varies with tan $\theta$. If particle size and strain contributes to line broadening are independent to each other, then observed line broadening can be calculated by adding Scherrer equation & equation 2.

$$\beta = \frac{k\lambda}{D\cos\theta} + 4\varepsilon\tan\theta \quad (3)$$

After rearrangement of equation 3 we get:

$$\beta\cos\theta = \frac{k\lambda}{D} + 4\varepsilon\sin\theta \quad (4)$$

Figure 7:
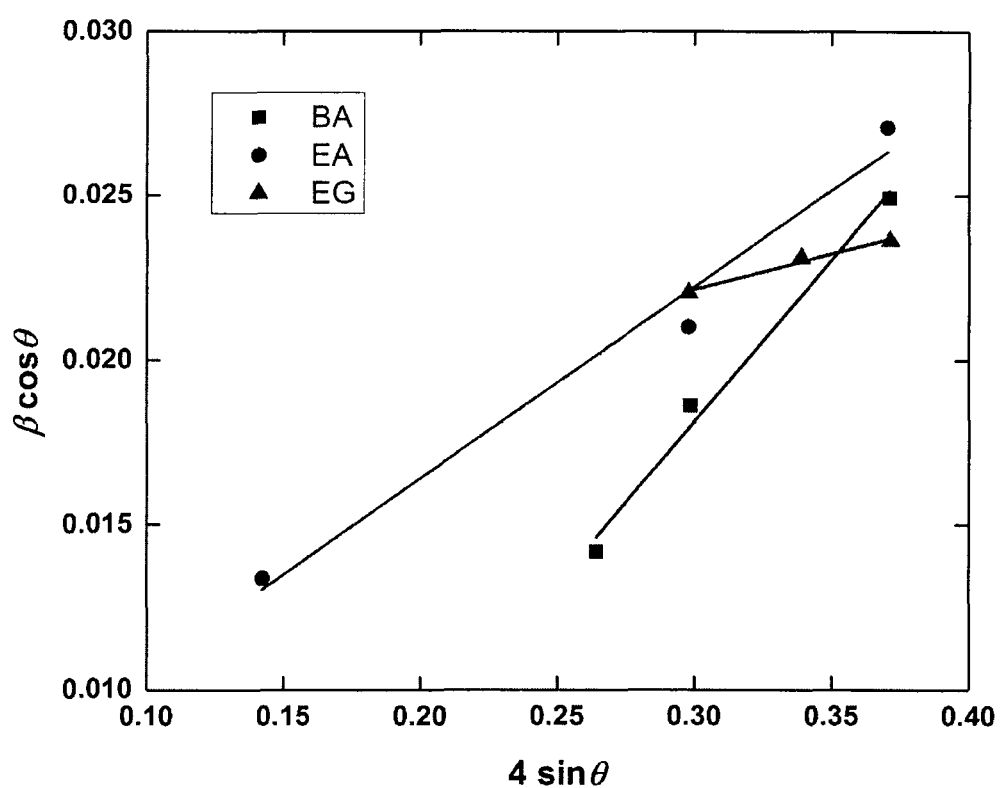
FIG. 7 depicts Williamson-Hall Plot of La/SnO$_2$—TiO$_2$ prepared in the presence of Ethyl acetate (EA) Benzyl alcohol (BA) and Ethylene glycol (EG).

This is called Williamson-Hall equation. The graph was plotted between 4 sin $\theta$ along x-axis and $\beta$ cos $\theta$ along y-axis for La/SnO$_2$—TiO$_2$ as shown in FIG. 7. W—H plot was used to study the effect of different solvents. Crystalline size was estimated from y-intercept.

Optical Properties and Band Gap Calculation

Figure 8:
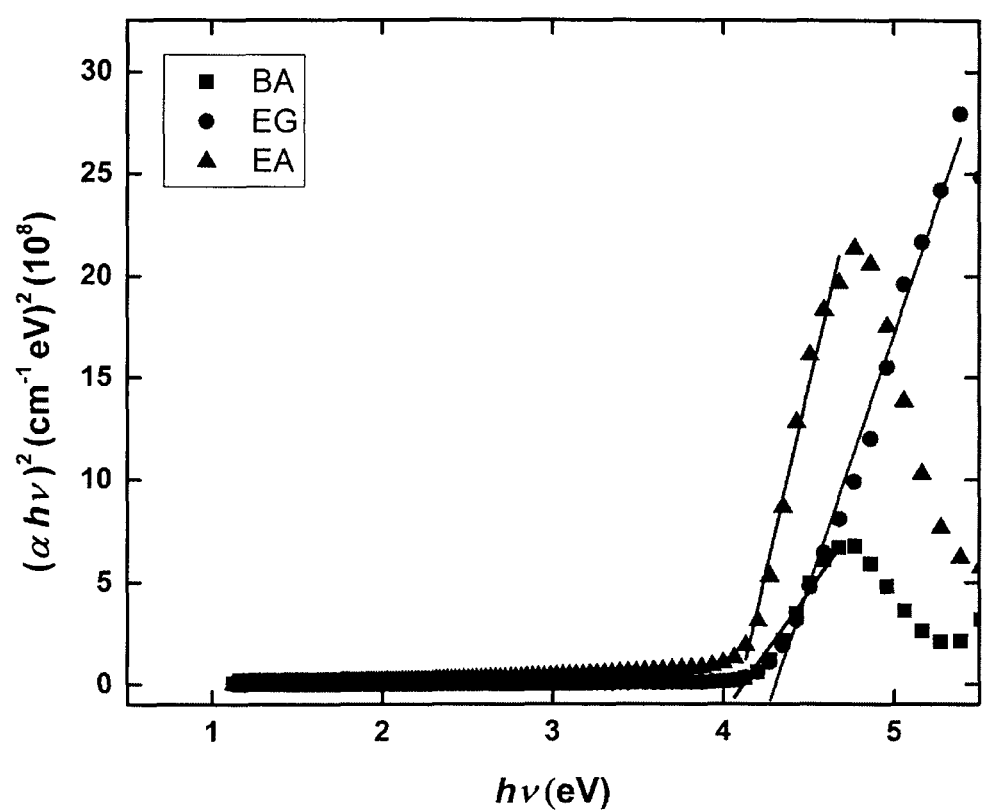
FIG. 8 shows the spectral dependence of La/SnO$_2$—TiO$_2$ synthesized by using different solvents.

In addition, FIG. 8 shows the spectral dependence of La/SnO$_2$—TiO$_2$ synthesized by using different solvents. The equation proposed by Wood and Tauc was used to calculate the optical band gap. The optical band gap energy is related with absorbance and photon energy according to the equation 5.

$$(\alpha h\nu) \alpha (h\nu - E_g)^{1/n} \quad (5)$$

Where $\alpha$ is the absorption coefficient, h$\nu$ is the photon energy, E$_g$ is the energy gap and n has different values as ½, 2, 3/2, 3 for allowed indirect, forbidden direct and forbidden indirect transitions. While $\alpha$ is calculated using equation 6

$$\alpha = 2.303 \frac{1000\rho A}{lCM} \quad (6)$$

where $\rho$ is theoretical density of lanthanum, l is length of quartz cell C is the molar concentration of the solution and M is molar mass of the material. The sample for absorbance measurement was prepared by sonicating 10 mg of La/SnO$_2$—TiO$_2$ powder in 3 mL of deionized water for 4 hrs at room temperature. Band gap was calculated by extrapolating linear portion of the curve plot between h$\nu$ on x-axis and $(\alpha h\nu)^2$ on y-axis. Band gap can be associated with the energy difference between valance band and conduction band. Band gap of synthesized material is given in the Table 1. Optical band gap of bulk lanthanum was found to be reduced from 5.8 to 4 eV in nano La/SnO$_2$—TiO$_2$ for sample prepared in the presence of different solvents. Results revealed that in the presence of SnO$_2$—TiO$_2$ as host material for doping of La the optical properties of metal changes and band gap decreases.

In FIG. 8 the band gap energy of La/SnO$_2$—TiO$_2$ synthesized in the presence of Ethyl acetate (EA) Benzyl alcohol (BA) and Ethylene glycol (EG).

Photocatalytic Activity of La/SnO$_2$—TiO$_2$ for Methylene Blue Degradation 20 ppm stock solution of Methylene Blue (MB) was prepared. 15 mg of La/SnO$_2$—TiO$_2$ was poured into the 25 mL of stock solution and kept under sunlight for 60 minutes with continuous stirring. This stirring allow the MB molecules to adsorbed on the La/SnO$_2$—TiO$_2$ particles and undergo photosensitization mechanism equation 7 to 11 for the formation of electronically excited oxygen atom (the singlet oxygen atom) and thus promote degradation efficiency.

$$MB \rightarrow MB^* \quad (7)$$

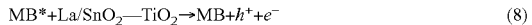
$$MB^* + La/SnO_2—TiO_2 \rightarrow MB + h^+ + e^- \quad (8)$$

$$O_2 + e^- \rightarrow O_2^- \quad (9)$$

$$h^+ + OH^- \rightarrow OH. \quad (10)$$

$$MB^* + O_2 \rightarrow MB + 2O(1D) \quad (11)$$

After 60 minutes absorbance of solution was recorded with an interval of 2 minutes. Absorbance was recorded at 665 nm ($\lambda_{max}$ of MB). To investigate the degradation capability of the nanocatalyst first order graphs were plotted between time and ln(A-A$_\infty$). Value of first order rate constant (k) was calculated from graph as given in FIG. 9. It was observed that with the decrease in particle size % age degradation of MB increases and rate constant also increase as given in Table 1 which indicates that with the decrease in particle size the surface area increases and photocatalytic activity of the nanomaterial increases.

Figure 9:
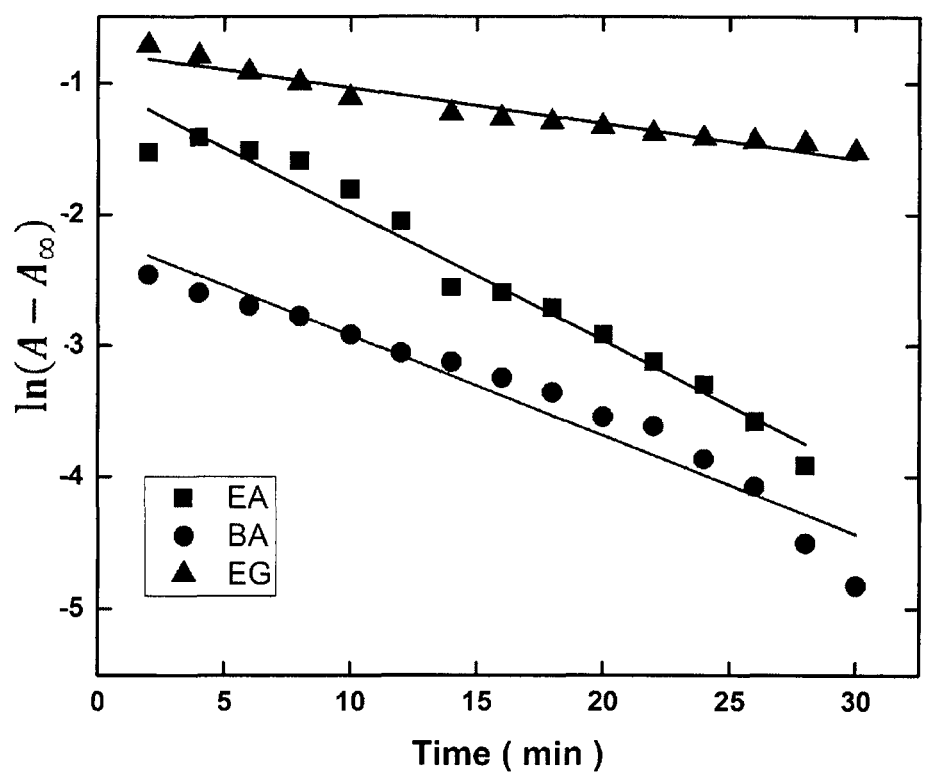
FIG. 9 shows the plot of ln(A–A$_\infty$) versus time for determination of rate constant values of La/SnO$_2$—TiO$_2$ prepared in the presence of Ethyl acetate (EA) Benzyl alcohol (BA) and Ethylene glycol (EG)

In FIG. 9 the plot of ln(A-A$_\infty$) versus time for determination of rate constant values of La/SnO$_2$—TiO$_2$ prepared in the presence of Ethyl acetate (EA) Benzyl alcohol (BA) and Ethylene glycol (EG).

Figure 10:
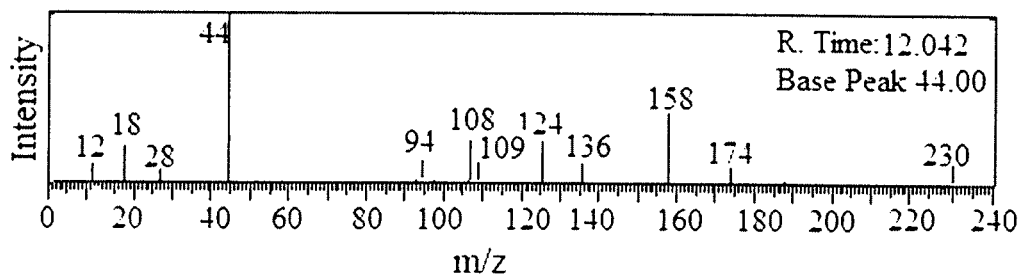
FIG. 10 shows the GC-MS chromatogram for MB degradation by La/SnO$_2$—TiO$_2$ at 12.042 min retention time.
Figure 11:
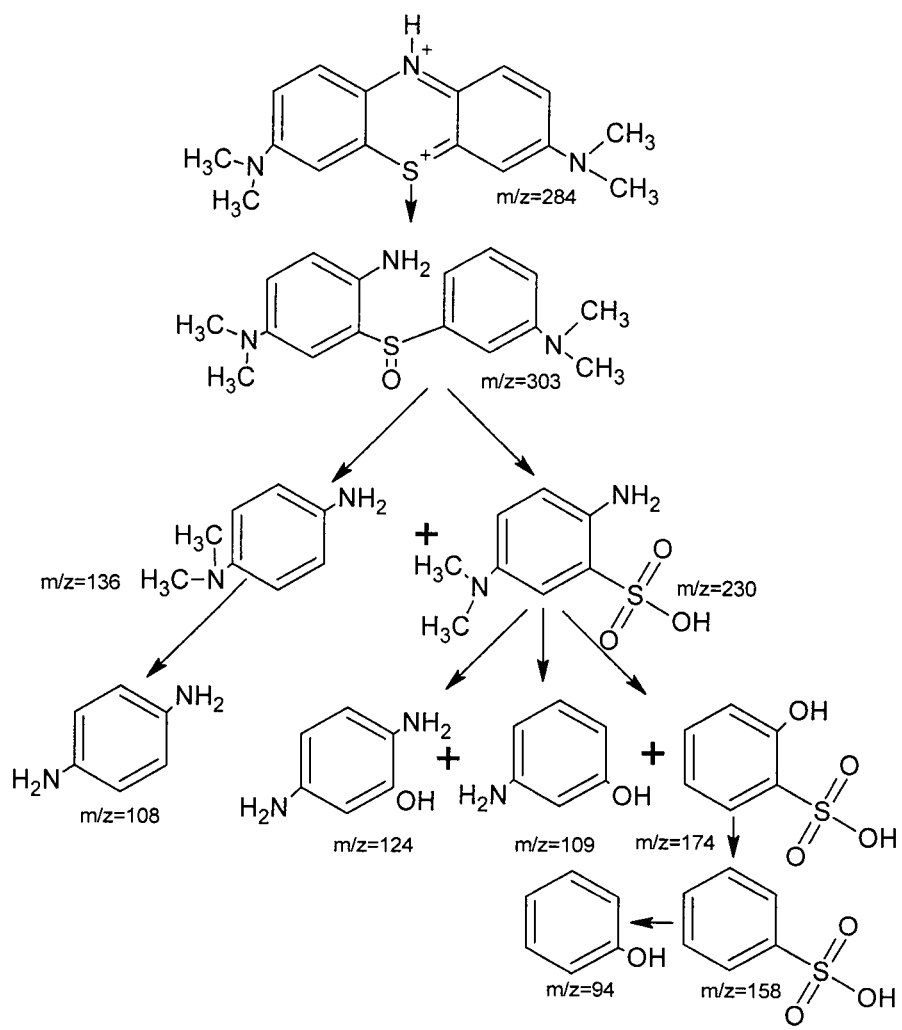
FIG. 11 shows the mechanism for degradation of Methylene Blue by La/SnO$_2$—TiO$_2$.

Catalytic degradation product of MB were identified using Gas Chromatography-Mass Spectrometry (GC-MS). Solution was filtered before injecting into GC-MS. Chromatogram is shown in FIG. 10 and proposed intermediate product are shown in FIG. 11. Base peak with m/z 44 is attributed to CO$_2$ evolution.

La/SnO$_2$—TiO$_2$ nanoparticles were prepared by hydrothermal method in the presence of different solvents having varying dielectric constant. Optical properties of the nanomaterial were measured in terms of band gap while photocatalytic degradation was investigated by using methylene blue. It was found that introduction of lanthanum on SnO$_2$—TiO$_2$ nanoparticles increase the catalytic activity and decrease the band gap of La to visible energy range (red shift) from 5.3 eV to 4.0-4.5 eV in this article. The dependence of rate constant/photodegradation activity on dielectric constant was investigated using double sphere model of ion-ion interaction, as given in equation 12. When two reactants (metal precursors and hydroxide) possesses opposite charge then rate constant "k" and percentage degradation activity is inversely proportional to the dielectric constant. As value of dielectric constant increases in Ethyl acetate (EA) Benzyl alcohol (BA) and Ethylene glycol (EG). from 6, 13.5 to 37 then the rate constant for degradation of MB decreases respectively (see Table 1).

$$lnk = lnko - \frac{e^2 Z_A Z_B}{D r_{AB} K_B T} \quad (12)$$

where D is the dielectric constant, k is specific rate constant for ion-ion interactions, $k_o$ is specific rate constant at zero ionic strength and infinite D, $K_B$ is Boltzmann's constant, r is radius of activated complex, T is temperature, e is charge on electron and $Z_A$ $Z_B$ are valance of ions A and B. Inverse relationship between rate constant "k" and the particle size was found, which shows that smaller particle size was achieved due to the early completion of reaction (nucleation) and have large surface area that increases the rate constant value/percentage degradation.

Band gap is generally the difference in energy between the highest occupied molecular orbital (HOMO) i.e valence band to the lowest unoccupied molecular orbital (LUMO) ie. conduction band, which decreases with the decrease in particle size and dielectric constant of the solvent used for synthesis of the nanomaterial. Decreased in band gap (red shift) with the decrease in particle size is due to delocalization in LUMO and create shallow/deep traps in electronic energy. Thus with the decrease in dielectric constant of reaction medium the small particle size of material was obtained (see Table 1).

What is claimed is:

1. A method of preparing a nanofilter membrane comprising:
   (a) preparing lanthanum doped tin-oxide and titanium oxide nanoparticles by adding, 50 mg of each of tin-oxide and titanium-oxide nanoparticles in 0.004M lanthanum precursor solution, mixing for 30 minutes to form a mix, adjusting the pH of the mix between 3-4, treating the mix in a hydrothermal autoclave for 120 minutes at 160° C., centrifuging the mix at 13000 rpm for 5 minutes, drying and calcining the mix 70° C. and 550° C., respectively;
   (b) preparing a dispersion of the lanthanum doped tin-oxide and titanium-oxide nanoparticles by adding 15 mg of nanoparticle (a) into 20 mL acetone and 20 mL 2-propanol;
   (c) preparing a solution 1 g of diethylaminoethyl cellulose and 1 g of polyvinyl alcohol in 20 mL distilled water and sonicating it for 120 minutes;
   (d) mixing the dispersion (b) and the solution (c) and sonicating it for 5 hours to form a mixture;
   (e) immersing a nitrocellulose membrane with porosity of 0.22 microns in the mixture (d) and allowing soaking for at least 12 hours; and,
   (f) drying the nitrocellulose membrane (e) in air for 20 seconds and then placing it in a gooch crucible to dry.

2. The method of preparing a nanofilter membrane of claim 1, wherein the nanofilter membrane has photo-catalytic properties.

3. The method of preparing a nanofilter membrane of claim 1, wherein the nanofilter membrane can be used to remove pesticides, organic matter, oil, pollutants from industrial waste water, as well as desalination of water.

* * * * *

UNITED STATES PATENT AND TRADEMARK OFFICE
CERTIFICATE OF CORRECTION

PATENT NO.           : 10,258,977 B2
APPLICATION NO.      : 15/131814
DATED                : April 16, 2019
INVENTOR(S)          : Muhammad Akhyar Farrukh It is certified that error appears in the above-identified patent and that said Letters Patent is hereby corrected as shown below:

On the Title Page

At (12) Please correct "Furrukh" to "Farrukh"

At (71) Applicant: Please correct the spelling of the Applicant's name to "Muhammad Akhyar Farrukh"

At (72) Inventor: Please correct the spelling of the Inventor's name to "Muhammad Akhyar Farrukh"

Signed and Sealed this
Eleventh Day of June, 2019

Andrei Iancu
*Director of the United States Patent and Trademark Office*